US012570355B2

(12) United States Patent
Strecker et al.

(10) Patent No.: US 12,570,355 B2
(45) Date of Patent: Mar. 10, 2026

(54) APPARATUS FOR A STEERING SYSTEM OF A MOTOR VEHICLE, MOTOR VEHICLE, METHOD FOR OPERATING A STEERING SYSTEM OF A MOTOR VEHICLE

(71) Applicant: Robert Bosch GmbH, Stuttgart (DE)

(72) Inventors: Joerg Strecker, Pluederhausen (DE); Michael Sprinzl, Suessen (DE)

(73) Assignee: Robert Bosch GmbH, Stuttgart (DE)

( * ) Notice: Subject to any disclaimer, the term of this patent is extended or adjusted under 35 U.S.C. 154(b) by 262 days.

(21) Appl. No.: 18/187,529

(22) Filed: Mar. 21, 2023

(65) Prior Publication Data

US 2023/0311975 A1 Oct. 5, 2023

(30) Foreign Application Priority Data

Apr. 4, 2022 (DE) ...................... 10 2022 203 329.9

(51) Int. Cl.
B62D 5/00 (2006.01)
B62D 15/02 (2006.01)
(52) U.S. Cl.
CPC ........... B62D 5/006 (2013.01); B62D 15/021 (2013.01)
(58) Field of Classification Search
CPC ...... B62D 5/006; B62D 15/021; B62D 6/008; B62D 15/025; B62D 5/0463; B62D 15/02; B62D 15/024
See application file for complete search history.

(56) References Cited

U.S. PATENT DOCUMENTS

| | | | | |
|---|---|---|---|---|
| 6,219,604 | B1 * | 4/2001 | Dilger | B62D 6/008 |
| | | | | 180/443 |
| 10,065,639 | B2 * | 9/2018 | Taniguchi | B62D 15/025 |
| 11,225,248 | B2 * | 1/2022 | Tsuji | B60W 50/10 |
| 11,524,715 | B2 * | 12/2022 | Kodera | B62D 5/0463 |
| 2002/0035424 | A1 * | 3/2002 | Kaufmann | B62D 5/001 |
| | | | | 180/443 |

(Continued)

FOREIGN PATENT DOCUMENTS

DE 10 2013 110 848 A1 4/2015

*Primary Examiner* — Phutthiwat Wongwian
*Assistant Examiner* — Brian R Kirby
(74) *Attorney, Agent, or Firm* — Maginot, Moore & Beck LLP

(57) ABSTRACT

An apparatus for operating a motor vehicle, wherein the steering system comprises an actuatable steering handle and a steerable wheel, wherein the steering handle is mechanically decoupled from the wheel such that an actuation of the steering handle is independent from a steering of the wheel, wherein the steering handle is associated with a controllable steering handle actuator for generating a torque acting on the steering handle, and wherein the wheel is associated with a controllable wheel actuator for influencing a wheel steering angle of the wheel, with a computing device configured to control the steering handle actuator and the wheel actuator. The computing device is configured to specify a target manual torque ($HM_{Target}$) for the steering handle as a function of a target variable specified by a driving assistance system and to control the steering handle actuator as a function of the specified target manual torque ($HM_{Target}$).

16 Claims, 3 Drawing Sheets

(56)                    References Cited

U.S. PATENT DOCUMENTS

| | | | | |
|---|---|---|---|---|
| 2003/0200018 A1 * | 10/2003 | Arimura | .............. | B62D 5/0484 |
| | | | | 180/443 |
| 2003/0220727 A1 * | 11/2003 | Husain | ................... | B62D 6/008 |
| | | | | 180/443 |
| 2004/0040781 A1 * | 3/2004 | Fujioka | ............... | B62D 5/0466 |
| | | | | 180/446 |
| 2004/0148078 A1 * | 7/2004 | Nakano | ................. | B62D 5/008 |
| | | | | 180/443 |
| 2004/0168848 A1 * | 9/2004 | Bohner | ................ | F16F 15/035 |
| | | | | 180/403 |
| 2004/0206570 A1 * | 10/2004 | Tajima | ................... | B62D 6/002 |
| | | | | 701/41 |
| 2011/0015850 A1 * | 1/2011 | Tange | .................. | B60W 30/12 |
| | | | | 701/116 |
| 2013/0103264 A1 * | 4/2013 | Takashima | ........... | B62D 5/0472 |
| | | | | 701/41 |
| 2015/0151786 A1 * | 6/2015 | Fujii | ..................... | B62D 6/008 |
| | | | | 701/41 |
| 2017/0029018 A1 * | 2/2017 | Lubischer | .............. | B62D 5/001 |
| 2018/0086341 A1 * | 3/2018 | Taniguchi | ............. | B62D 6/008 |
| 2019/0047618 A1 * | 2/2019 | Hultén | ................. | B60W 10/30 |
| 2019/0092377 A1 * | 3/2019 | Shin | ..................... | B62D 5/0481 |
| 2021/0221430 A1 * | 7/2021 | Mannava | .............. | B62D 6/008 |

* cited by examiner

APPARATUS FOR A STEERING SYSTEM OF A MOTOR VEHICLE, MOTOR VEHICLE, METHOD FOR OPERATING A STEERING SYSTEM OF A MOTOR VEHICLE

This application claims priority under 35 U.S.C. § 119 to patent application no. DE 10 2022 203 329.9, filed on Apr. 4, 2022 in Germany, the disclosure of which is incorporated herein by reference in its entirety.

The disclosure relates to an apparatus for a steering system of a motor vehicle, wherein the steering system comprises an actuatable steering handle and at least one steerable wheel, wherein the steering handle is mechanically decoupled from the wheel in such a way that an actuation of the steering handle is independent from a steering of the wheel, wherein the steering handle is associated with a controllable steering handle actuator for generating a torque acting on the steering handle, and wherein the wheel is associated with a controllable wheel actuator for influencing a wheel steering angle of the wheel, with a computing device, which is configured so as to control the steering handle actuator and the wheel actuator.

In addition, the disclosure relates to a motor vehicle having a steering system comprising an actuatable steering handle and at least one steerable wheel, wherein the steering handle is mechanically decoupled from the wheel in such a way that an actuation of the steering handle is independent from a steering of the wheel, wherein the steering handle is associated with a controllable steering handle actuator for generating a torque acting on the steering handle, and wherein the wheel is associated with a controllable wheel actuator for influencing a wheel steering angle of the wheel.

The disclosure furthermore relates to a method for operating a steering system of a motor vehicle, wherein the steering system comprises an actuatable steering handle and at least one steerable wheel, wherein the steering handle is mechanically decoupled from the wheel in such a way that an actuation of the steering handle is independent from a steering of the wheel, wherein the steering handle is associated with a controllable steering handle actuator for generating a torque acting on the steering handle, and wherein the wheel is associated with a controllable wheel actuator for influencing a wheel steering angle of the wheel.

BACKGROUND

Steering systems and apparatuses are known from the prior art.

A steering system typically comprises an actuatable steering handle and at least one steerable wheel. In so-called steer-by-wire steering systems, the steering handle is mechanically decoupled from the wheel in such a way that an actuation of the steering handle is independent from a steering of the wheel. Thus, there is no mechanical coupling between the steering handle and the wheel that necessarily translates an actuation of the steering handle into a steering of the wheel. In doing so, the steering handle in steer-by-wire steering systems is associated with a controllable steering handle actuator for generating a torque acting on the steering handle. The wheel is also associated with a controllable wheel actuator for influencing a wheel steering angle of the wheel. In order to operate or control a steer-by-wire steering system, there is typically an apparatus having a computing device, wherein the computing device is configured so as to control the steering handle actuator and the wheel actuator.

SUMMARY

The apparatus according to the disclosure with the features disclosed has the advantage that a particularly comfortable implementation of driving assistance systems acting on the steering system can be achieved for a user of the motor vehicle. According to the present disclosure, it is provided that the computing device is configured so as to specify a target manual torque for the steering handle as a function of a target variable that can be specified by a driving assistance system and to control the steering handle actuator as a function of the specified target manual torque. According to the present disclosure, the target manual torque for the steering handle is thus specified as a function of the specified or specifiable target variable, so that a manual torque regulation is carried out. A steering handle is a device with which a user can specify a transverse guidance desire or a trajectory for the motor vehicle. For example, the steering handle is configured as a steering wheel, a control column, or a joystick. The manual torque is the torque, or force, that a user of the steering handle must at least exert in order to block a change in an actuating position of the steering handle due to the manual torque. According to the disclosure, because the target manual torque is specified as a function of the target variable, a steering feeling that is particularly comfortable for the user can be generated in case of an active driving assistance system. In addition, the specification of a desired target manual torque is easily adjustable to the concrete specifications of different vehicle manufacturers. According to the disclosure, the motor vehicle comprises at least one steerable wheel. However, a plurality of steerable wheels can also be present. Preferably, the motor vehicle comprises at least one wheel axis with two steerable wheels. If a wheel axis with two steerable wheels is present, the two steerable wheels are mechanically coupled to one another, for example, such that a steering of the one wheel is dependent on the steering of the other wheel. In particular, the two wheels are mechanically coupled to one another by a rack of the steering system. If the two steerable wheels are mechanically coupled to one another, there is preferably only one controllable wheel actuator associated with both wheels. However, the two steerable wheels can also be mechanically decoupled such that the steering of the one wheel is independent from the steering of the other wheel. In such an embodiment of the steering system, each of the steerable wheels is preferably associated with a different wheel actuator or individual wheel adjuster for influencing the wheel steering angle of the respective wheel. The apparatus is then preferably configured so as to control both wheel actuators. The specified target variable describes a desired steering of the motor vehicle. The target variable can generally refer to different elements of the steering system. For example, the target variable is a target angle, in particular a target wheel steering angle of the steerable wheel, or a target steering wheel angle of the steering handle configured as a steering wheel. However, the target variable can also be a target position, for example a target rack position of the aforementioned rack. The rack position can be converted into a fictitious wheel steering angle by certain simplifications. For example, the driving assistance system is a track guidance assistant, an evasion assistant, or the like. Preferably, the driving assistance system is an external driving assistance system. This means that a driving assistance function of the driving assistance system is not calculated by the computing device of the apparatus, but rather by a further computing device that is external in relation to the apparatus. Alternatively, the driving assistance system is preferably an internal driving assistance system. This means that the driving assistance system is implemented into the computing device of the apparatus such that the computing device of the apparatus calculates the driving assistance function. Preferably, the computing device is configured so as to provide a target motor torque for the steering handle actuator as a function of the specified target manual torque and to control the steering handle actuator as a function of the specified target motor torque. A motor torque regulation is thus in particular arranged directly downstream of the target manual torque.

According to a preferred embodiment, it is provided that the computing device is configured so as to specify a target actuating position for the steering handle as a function of the target variable and to specify the target manual torque as a function of a deviation of a determined actual actuating position of the steering handle from the target actuating position. If the steering handle is rotatable, then the target actuating position is a target angle and the actual actuating position is an actual angle. The computing device is thus configured so as to carry out a position regulation or angle regulation. However, the position regulation or angle regulation is not realized directly by a position regulator or angle regulator, but rather indirectly by the manual torque regulation. In hands-on operation, i.e. when the user is holding the steering handle, this can generate a particularly intuitive steering feeling for the user in case of an active driving assistance system. For example, the target manual torque is increased with an increase of the deviation and/or decreased with a decrease of the deviation.

Preferably, the computing device is configured so as to specify a target wheel steering angle for the wheel as a function of the target variable and to drive the wheel actuator as a function of the target wheel steering angle. The target variable is therefore also used as the basis for controlling the wheel actuator. By considering the target variable in the specification of the target wheel steering angle, it is achieved that the driving assistance function of the driving assistance system is actually implemented. The apparatus is characterized by its versatile usability. Thus, the apparatus can advantageously implement driver assistance systems of various SE automation stages in hands-on operation as well as hands-off operation, i.e. when the user is not holding the steering handle. For example, in a driving assistance system according to an SAE level≥3, the steering handle can be carried along in complement to the steering of the motor vehicle. The position of the steering handle can be cleared up, for example, with respect to disturbing vibrations due to the mechanical decoupling from the wheels. By carrying the steering handle along, a possible assumption of responsibility for the transverse guidance of the motor vehicle is facilitated for the user. For example, in a driving assistance system according to an SAE level<3, the user can be prompted to steer along with the specification of the driving assistance system in hands-on operation. Because only the working point of the regulation of the target manual torque and not its basic characteristic is changed, the user experiences a particularly comfortable steering feeling. According to an alternative embodiment, it is preferably provided that the computing device is configured so as to specify the target wheel steering angle as a function of a further target variable that can be specified by the driving assistance system. The further target variable can be a target angle or a target position, as previously explained for the target variable. Again, an apparatus is obtained that is characterized by its versatility. In particular, the computing device is configured so as to specify a target motor torque for the wheel steering actuator as a function of the specified target wheel steering angle and to control the wheel steering actuator as a function of the specified target motor torque.

Preferably, the computing device is configured so as to specify the target wheel steering angle as a function of the actual actuating position of the steering handle. This results in the advantage that the user of the motor vehicle can still easily control the steering of the wheel by changing the actuating position of the steering handle despite the active driving assistance system. This is explained in greater detail below based on a specific example in which the driving assistance system is an evasion assistant according to an SAE level<3. In this concrete example, the evasion assistant senses an obstruction in the trajectory of the motor vehicle. As a result, the evasion assistant decides that the motor vehicle is to drive to the left past the obstruction and provides the computing device with a corresponding target variable or corresponding target greater variables. However, the user of the motor vehicle wishes to drives to the right past the obstruction and rotates the steering handle configured as a steering wheel in the right direction in the present case. Because the computing device is configured so as to specify the target wheel steering angle as a function of the actual actuating position of the steering handle, a target wheel steering angle that would lead to an evasion of the motor vehicle to the left is not specified, but rather a target wheel steering angle that leads to an evasion of the motor vehicle to the right is specified. The computing device is preferably configured so as to specify the target wheel steering angle as a function of the actual actuating position of the steering handle as well as a function of the specified target variable or the specified further target variable. Particularly preferably, the computing device is configured so as to provide a preliminary target wheel steering angle as a function of the actual actuating position in accordance with a steering ratio, to determine a target additional angle as a function of the target variable or the further target variable, and to specify the target wheel steering angle by impinging the preliminary target wheel steering angle with the target additional angle. In particular, the computing device comprises a limiting module configured so as to limit the target additional angle. This results in the actual steering behavior of the motor vehicle and the actuating position of the steering handle deviating not too far from one another. The limitation of the target additional angle is particularly advantageous in case of a driving assistance system according to an SAE level<3. Preferably, the limiting module can be deactivated. The deactivation of the limiting module is advantageous for the implementation of driving assistance systems according to an SAE level≥3. The active limiting module could otherwise limit the function of the driving assistance system, in particular if the user blocks a change in the actuating position of the steering handle.

Preferably, the computing device is configured so as to modify the target variable and/or the further target variable by means of at least one transfer function. Possible transfer functions are, for example, an impingement with an offset value, a multiplication with a factor, a temporal filtering, and/or a signal smoothing. Preferably, the computing device is configured so as to specify the target actuating position by modifying the target variable by means of at least one transfer function. If both the target actuating position and the target wheel steering angle are specified as a function of the target variable, the target variable is preferably modified for this purpose by different transfer functions. By modifying the target variable and/or the further target variable, it can be avoided, for example, that a dynamic steering performed by the driving assistance system leads to an equally dynamic movement of the steering handle. In particular, the target variable is modified so as to dampen the movement of the steering handle. For example, the target variable is multiplied by a factor less than 1. If the target actuating position is specified as a function of the target variable and the target wheel steering angle as a function of the further target variable, the computing device in particular does not modify the target variable and the further target variable. Preferably, the target variable and the further target variable are then already modified by the driving assistance system so that the target variable and the further target variable of the computing device are already specified as a modified target variable and as a modified further target variable. In particular, the target variable then directly corresponds to the target actuating position.

According to a preferred embodiment, it is provided that the apparatus comprises a steering feeling calculation function and is configured so as to specify the target manual torque in case of an inactive driving assistance system as well as an active driving assistance system according to the steering feeling calculation function. The use of a steering feeling calculation function is generally known from the prior art. With the steering feeling calculation function, it can be achieved that the user of the motor vehicle experiences a steering feeling that is appropriate for the motor vehicle. Typically, the steering feeling calculation function has several sub-functions, so that different variables can be considered when setting the target manual torque. If the target manual torque is specified according to the steering feeling calculation function even with an active driving assistance system, the steering feeling corresponding to the motor vehicle can also be generated with an active driving assistance system. Accordingly, it is avoided that the user experiences an inappropriate, synthetic steering feeling while the driving assistance system is active. The use of the same steering feeling calculation function with inactive and active driving assistance system also means a comparatively low application cost. This results from the fact that no separate steering feeling calculation function for a journey with an active driving assistance system must be created. In the case of an inactive driving assistance system, the target manual torque is typically specified according to the steering feeling calculation function, such that the steering handle is guided into a specified zero position. For example, if the steering handle is a steering wheel, the zero position is typically a steering wheel angle of 0°. With the driving assistance system active, the target manual torque is specified as a function of the specified target variable. The zero position is preferably changed as a function of the specified target variable. Thus, the target manual torque is then specified according to the steering feeling calculation function, such that the steering handle is guided into the changed zero position, for example into a steering wheel angle different from 0°.

According to a preferred embodiment, it is provided that the computing device is configured so as to determine a first force as a function of the deviation of the actual actuating position from the target actuating position and to specify the target manual torque in case of an active driving assistance system as a function of the first force. Concrete preferred examples for determining or calculating the first force as a function of the deviation are described, for example, in the application DE 10 2013 110 848 A1. The steering angle used in the determination or calculation of the first force is the deviation of the actual actuating position from the target actuating position.

Preferably, the computing device is configured so as to determine a second force as a function of an actual resetting force acting on the wheel and to specify the target manual torque in case of an inactive driving assistance system as a function of the second force. For example, the actual resetting force is calculated or estimated. If two steerable wheels are present that are mechanically coupled to one another by a rack, the actual resetting force is preferably an actual rack force acting on the rack. The actual rack force can be a model-based rack force (RFMC) determined at the vehicle level or a model-based rack force estimate (RFMD). In the case of an inactive driving assistance system, a steering feeling that is intuitive to the user can be generated by specifying the target manual torque as a function of the actual resetting force.

According to a preferred embodiment, it is provided that the computing device comprises a gradient limiting module configured so as to limit a rate of change of the specified target manual torque. By limiting the rate of change of the target manual torque, the comfort for the user can be further increased. In particular, it is avoided that the user experiences sudden manual torque spikes. Such manual torque spikes are typically perceived as disruptive. Preferably, the gradient limiting module is configured so as to limit the rate of change at least when switching from one operating mode into the other operating mode. During the switching between operating modes, increased manual torque spikes would otherwise be expected. Preferably, the computing device is configured so as to switch from one operating mode into the other operating mode upon detecting an activation or deactivation of the driving assistance system.

Preferably, the computing device comprises an additional torque module configured so as to specify a target additional torque and to impinge the target manual torque with the target additional torque. Thus, a preliminary target manual torque is initially specified. This is impinged with the target additional torque in order to specify the target manual torque. A target steering handle behavior can be enhanced by the additional torque module. Preferably, there is a limiting module that limits the target additional torque. In particular, the limiting module is part of the additional torque module. Alternatively, the limiting module is arranged signally downstream of the additional torque module, for example. For example, the limiting module is configured so as to limit the target additional torque to ±3 Nm.

According to a preferred embodiment, it is provided that the additional torque module is configured so as to specify the target additional torque as a function of the deviation of the actual actuating position from the target actuating position and/or as a function of a deviation of an actual trajectory of the motor vehicle from a specified target trajectory of the motor vehicle. Preferably, the target additional torque is specified when the deviation of the actual actuating position from the target actuating position exceeds a specified threshold and/or when a deviation increase exceeds a specified threshold. With the additional torque, the position regulation can then be supported, wherein the deviation is used as the input variable. This can, for example, prevent the driver from jerkily steering away from the target actuating position. Preferably, the target additional torque is specified when a deviation of the actual trajectory from the target trajectory exceeds a specified threshold. The control variable is then a variable independently sensed due to the deviation of the actual actuating position from the target actuating position. For example, the deviation of the actual trajectory from the target trajectory is determined as a function of a sensor signal of an environmental sensor.

According to a preferred embodiment, it is provided that the computing device comprises a first computing unit and a second computing unit, wherein the first computing unit is configured so as to specify the target manual torque, and wherein the second computing unit is configured so as to specify the target wheel steering angle. In particular, the computing units are implemented in different controllers of the apparatus or the motor vehicle. According to an alternative embodiment, it is preferably provided that the computing device comprises a computing unit configured so as to specify both the target manual torque and the target wheel steering angle. This design of the computing device is technically particularly easy to implement, for example because required measured variables need only be supplied to one computing unit.

The computing device preferably comprises a communication device for receiving the target variable, or the target variable and the further target variable. If only the target variable is specified by the driving assistance system, the communication device preferably only comprises one communication means for receiving the target variable. If both the target variable and the further target variable are specified by the driving assistance system, the communication device comprises either only one communication means for receiving both target variables or a communication means for receiving the target variable and a further communication means for receiving the further target variable. Preferably, the one or more communication means is/are configured as wireless communication means or as a communication terminal.

The motor vehicle according to the disclosure is characterized by the apparatus according to the disclosure having features of the disclosure. This, too, results in the aforementioned advantages. Further preferred features and combinations of features result from the foregoing description as well as from the claims. Preferably, the motor vehicle comprises a driving assistance system, which is configured so as to specify the target variable, or the target variable and the further target variable, to the computing device. In particular, the driving assistance system is a track guidance assistant or an evasion assistant.

The method according to the disclosure is characterized by features of the disclosure in that a target manual torque is specified for the steering handle as a function of a target variable specified by a driving assistance system, and in that the steering handle actuator is controlled as a function of the specified target manual torque. This, too, results in the aforementioned advantages. Further preferred features and combinations of features result from the above-described disclosure and from the claims.

BRIEF DESCRIPTION OF THE DRAWINGS

The disclosure will be explained in greater detail in the following with reference to the drawings. The figures show.

DETAILED DESCRIPTION

Figure 1:
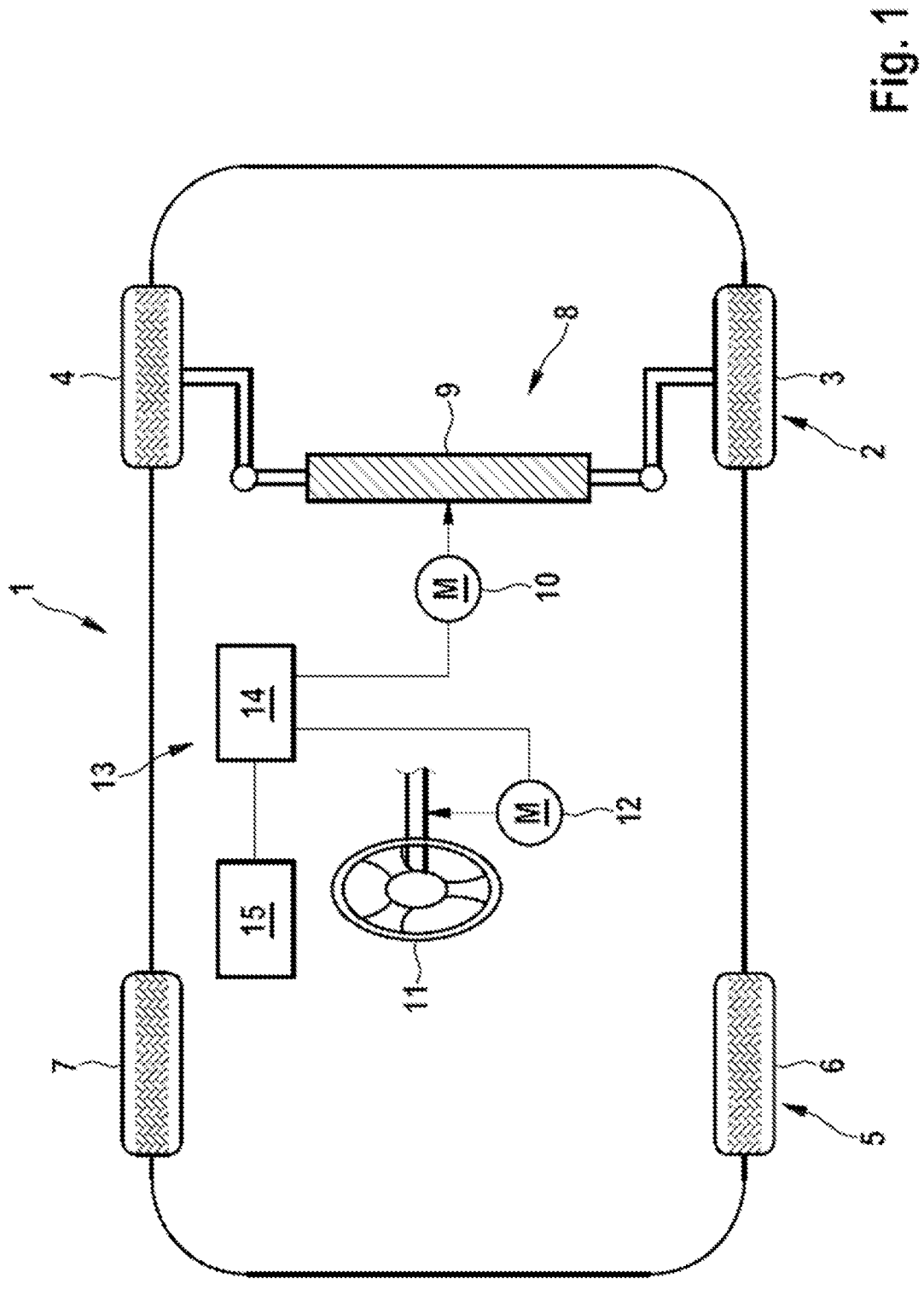
FIG. 1 a motor vehicle in a schematic view.

FIG. 1 shows a simplified view of a motor vehicle 1. The motor vehicle 1 comprises a front wheel axle 2 with two wheels 3 and 4 and a rear wheel axle 5 with two wheels 6 and 7.

The motor vehicle 1 comprises a steering system 8. In the present case, the wheels 3 and 4 of the front wheel axle 2 are steerable, such that these wheels 3 and 4 are part of the steering system 8. The wheels 3 and 4 are mechanically coupled to one another by a rack 9 of the steering system 8, such that a steering of one of the wheels 3 and 4 is dependent on a steering of the other of the wheels 3 and 4. Thus, if a wheel steering angle of one of the wheels 3 and 4 is changed, the wheel steering angle of the other of the wheels 3 and 4 is also changed due to the mechanical coupling by the rack 8. The steering system 8 comprises a controllable wheel actuator 10. The wheel actuator 10 is configured so as to impinge the rack 9 with a torque in order to thereby influence the wheel steering angle of the wheels 3 and 4. According to a further embodiment example, the wheels 3 and 4 are mechanically decoupled from one another such that a steering of one of the wheels 3 and 4 is independent from a steering of the other of the wheels 3 and 4. In such an embodiment of the motor vehicle 1, each of the steerable wheels 3 and 4 is preferably associated with a different wheel actuator for influencing the wheel steering angle of the respective wheel.

The steering system 8 also comprises a steering handle 11 that is actuatable by a user of the motor vehicle 1. In the present case, the steering handle 11 is configured as a steering wheel 11. The steering handle 11 is mechanically decoupled from the wheels 3 and 4 such that an actuation of the steering handle 11 is independent from a steering of the wheels 3 and 4. Thus, there is no mechanical coupling between the steering handle 11 and the wheels 3 and 4 that necessarily translates a change in an actuating position of the steering handle 11 into a steering of the wheels 3 and 4. Accordingly, the steering system 8 is configured as a steer-by-wire steering system 8. The steering system 8 also comprises a steering handle actuator 12. The steering handle actuator 12 is associated with the steering handle 11 and is configured so as to generate a torque acting on the steering handle 11 in order to thereby influence the actuating position of the steering handle 11.

The motor vehicle 1 also comprises an apparatus 13 for operating the steering system 11. The apparatus 13 comprises a computing device 16 that is not visible in FIG. 1. In the present case, the computing device 16 is integrated into a controller 14. The computing device 16 is configured so as to control the wheel actuator 10 and the steering handle actuator 12. For this purpose, the computing device 16 is communicatively connected to the wheel actuator 10 and the steering handle actuator 12.

The motor vehicle 1 also comprises a driving assistance system 15. For example, the driving assistance system 15 is configured as a guidance assistant 15. In the present case, the driving assistance system 15 is configured as a driving assistance system 15 that is external with respect to the apparatus 13. This means that driving assistance functions of the driving assistance system 15 are not calculated by the computing device of the apparatus 13, but rather by a further computing device. According to a further embodiment example, the driving assistance system 15 is configured as an internal driving assistance system 15. This means that the driving assistance functions of the driving assistance system 15 are calculated by the computing device 16 of the apparatus 13.

The driving assistance system 15 is communicatively connected to the computing device 16, in the present case by way of a communication terminal 17 of the apparatus 13. The driving assistance system 15 is configured so as to specify a target variable Z as a function of a current driving situation and to provide the communication terminal 17 with the determined target variable Z. The target variable Z describes a desired steering of the motor vehicle 1 and can be related to various elements of the steering system 8. For example, the target variable Z is a target angle or a position of rack 9.

Figure 2:
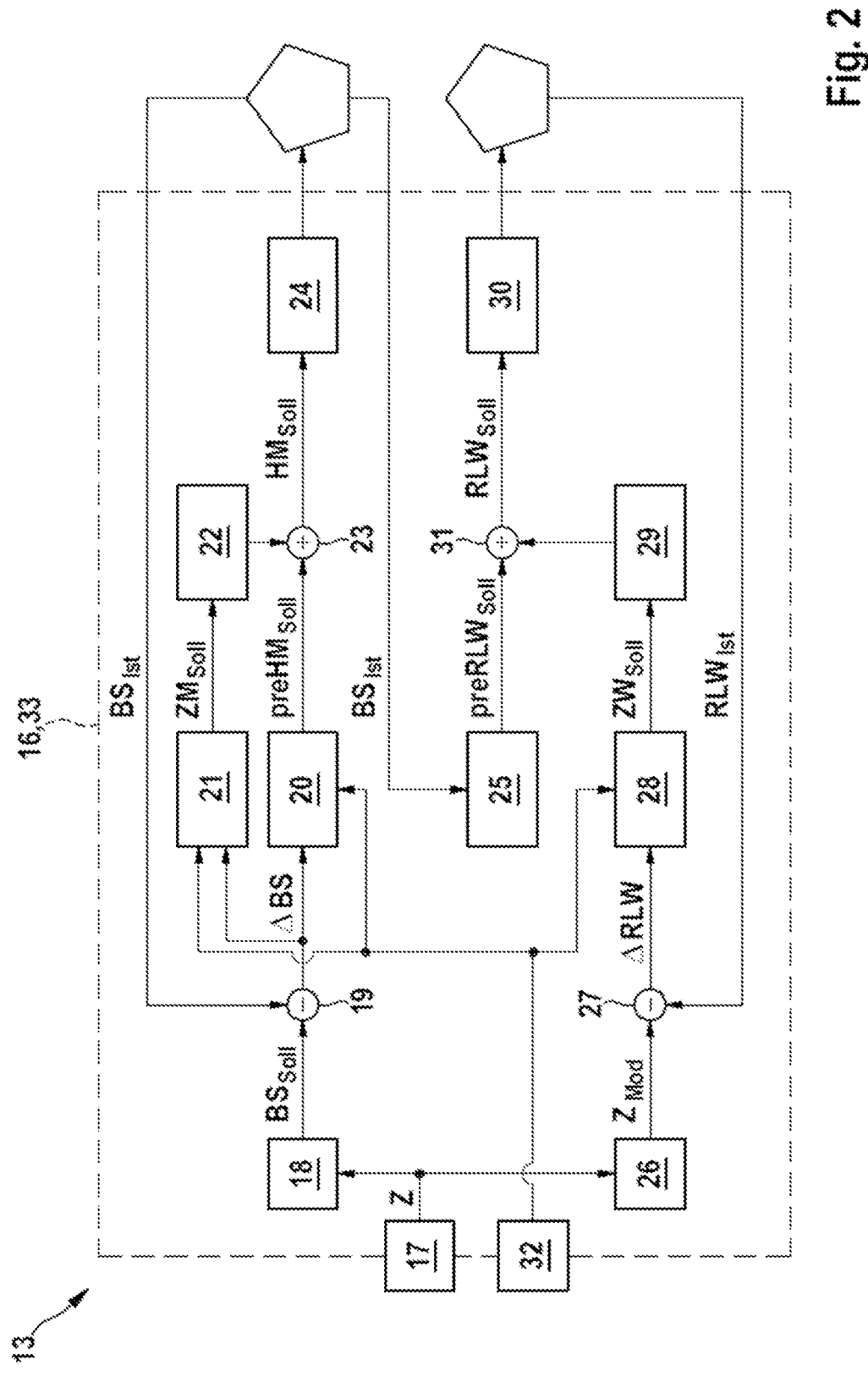
FIG. 2 an apparatus for operating a steering system of the motor vehicle.

In the following, the design of the computing device 16 is explained in greater detail with reference to FIG. 2. FIG. 2 shows a functional structure of the computing device 16 for this purpose.

A first transfer module 18 of the computing device 16 is arranged downstream of the communication terminal 17. The first transfer module 18 is configured so as to modify the specified target variable Z by means of at least one transfer function. For example, the transfer module performs a temporal filtering of the target variable Z. Alternatively or additionally, the target variable Z is impinged with an offset value by the first transfer module 18, for example. By modifying the target variable Z, the first transfer module 18 specifies a target actuating position $BS_{Target}$ for the steering handle 11.

A first differential module 19 of the computing device 16 is arranged downstream of the first transfer module 18. The first differential module 19 is configured so as to specify a deviation $\Delta BS$ of a determined or sensed actual actuating position $BS_{Actual}$ of the steering handle 11 from the specified target actuating position $BS_{Target}$.

The first differential module 19 is arranged downstream of a manual torque specification module 20 of the computing device 16. The manual torque specification module 20 is configured so as to specify a preliminary target manual torque $preHM_{Target}$. The computing device 16 has a first operating mode and a second operating mode, wherein the switching between the two operating modes is discussed later. The manual torque specification module 20 is configured so as to determine a first force and a second force. The first force determines the manual torque specification module 20 as a function of the deviation $\Delta BS$ of the actual actuating position $BS_{Actual}$ from the target actuating position $BS_{Target}$. The second force determines the manual torque specification module 20 as a function of a determined or sensed actual rack force acting on the rack 9. If the first operating mode of the computing device 16 is set, the manual torque specification module 20 provides the preliminary target manual torque $preHM_{Target}$ as a function of the first force. If the second operation mode of the computing device 16 is set, the manual torque specification module 20 provides the preliminary target manual torque $preHM_{Target}$ as a function of the second force. In both the first operating mode and the second operating mode, the manual torque specification module 20 provides the preliminary target manual torque $preHM_{Target}$ according to the same steering feeling calculation function. In the first operating mode, the first force and in the second mode, the second force is input into the steering feeling calculation function. Also, by way of sub-modules of manual torque specification module 20, which use a steering angle as the input variable, in the first operating mode, the deviation $\Delta BS$ and in the second operating mode, the actual actuating position $BS_{Actual}$ is used as the input variable.

The first differential module 19 is also arranged downstream of an additional torque module 21, wherein the presence of the additional torque module 21 is optional. The additional torque module 21 is configured so as to provide a target additional torque $ZM_{Target}$. For example, the additional torque module 21 specifies the target additional torque $ZM_{Target}$ as a function of the deviation $\Delta BS$. Alternatively or additionally, the additional torque module 21 provides the target additional torque $ZM_{Target}$ as a function of a target variable, which can be detected independently from the deviation $\Delta BS$. For example, the additional torque module 21 provides the target additional torque $ZM_{Target}$ as a function of a deviation of an actual trajectory of the motor vehicle 1 from a specified target trajectory.

A first limiting module 22 is arranged downstream of the additional torque module 21. The first limiting module 22 is configured so as to limit the specified target additional torque $ZM_{Target}$, for example to a value of ±3 Nm. According to a further embodiment example, the function of the first limiting module 22 is integrated into the additional torque module 21 such that the additional torque module 21 already limits the target additional torque $ZM_{Target}$ when determining the target additional torque $ZM_{Target}$.

The computing device 16 also comprises a first summation module 23. The first summation module 23 is configured so as to impinge the target preliminary manual torque $preHM_{Target}$ with the target additional torque $ZM_{Target}$. A target manual torque $HM_{Target}$ is thereby specified or obtained. The target variable Z is thus considered as the input variable at least in the first operating mode when defining the target manual torque $HM_{Target}$, namely in an upstream step. If the target additional torque $ZM_{Target}$ is zero, for example because the additional torque module 21 is inactive, the preliminary target manual torque $preHM_{Target}$ corresponds directly to the target manual torque $HM_{Target}$. If the additional torque module 21 is entirely omitted, the first summation module 23 is preferably also dispensed with, wherein the manual torque specification module 20 preferably directly specifies the target manual torque $HM_{Target}$.

Preferably, the computing device 16 comprises a gradient limiting module, not shown, which is configured so as to limit a rate of change of the target manual torque $HM_{Target}$. In particular, the gradient limiting module is configured so as to limit the rate of change of the target manual torque $HM_{Target}$ only when switching from one operating mode into the other. In particular, the gradient limiting module is configured so as to limit the rate of change of the target manual torque $HM_{Target}$ by limiting a rate of change of the preliminary target manual torque $preHM_{Target}$.

A first motor torque specification module 24 of the computing unit 16 is arranged downstream of the first summation module 23. The motor torque specification module 24 is configured so as to specify a first target motor torque as a function of the target manual torque $HM_{Target}$ and to control the steering handle actuator 12 as a function of the first target motor torque such that the steering handle 11 is impinged with a torque corresponding to the target manual torque $HM_{Target}$.

The computing device 16 also comprises a steering ratio module 25. The steering ratio module 25 is configured so as to specify a preliminary target wheel steering angle $preRLW_{Target}$ for the wheels 3 and 4 as a function of the actual actuating position $BS_{Actual}$ of the steering handle 11, for example by means of a characteristic curve that describes the preliminary target wheel steering angle $preRLW_{Target}$ as a function of the actual actuating position $BS_{Actual}$. In particular, the steering ratio module 25 can be deactivated. The deactivation of the steering torque ratio module 25 is advantageous, for example, when the driving assistance system 15 is a driving assistance system according to an SAE level≥3.

A second transfer module 26 of the computing device 16 is also arranged downstream of the communication terminal 17. The second transfer module 26 is configured so as to modify the specified target variable Z by means of at least one transfer function. Here, the transfer function applied by the second transfer module 26 is different from the transfer function applied by the first transfer module 18. For example, the target variable Z is more smoothed by the first transfer module 18 than by the second transfer module 26. By modifying the target variable Z, the second transfer module 26 specifies a modified target variable $Z_{Mod}$ in the form of an angular value.

A second differential module 27 of the computing device 16 is arranged downstream of the second transfer module 26. The second differential module 27 is configured so as to specify a deviation $\Delta RLW$ of a determined or sensed actual wheel steering angle $RLW_{Actual}$ of the wheels 3 and 4 from the modified target variable $Z_{Mod}$. The actual wheel steering angle $RLW_{Actual}$ is preferably a mean value of the wheel steering angle of the wheel 3 and the wheel steering angle of the wheel 4.

An additional angle specification module 28 of the computing device 16 is arranged downstream of the second transfer module 27. The additional angle specification module 28 is configured so as to specify a target additional angle $ZW_{Target}$ as a function of the deviation $\Delta RLW$. Preferably, the target additional angle $ZW_{Target}$ is increased with an increase of the deviation $\Delta RLW$.

A second limiting module 29 is arranged downstream of the additional angle specification module 28. The second limiting module 29 is configured so as to limit the specified target additional angle $ZW_{Target}$, for example to a value of $\pm 5°$. According to a further embodiment example, the function of the second limiting module 29 is integrated into the additional angle specification module 28, such that the additional angle specification module 28 already limits the target additional angle $ZW_{Target}$ upon determining the target additional angle $ZW_{Target}$. In particular, the second limiting module 29 can be deactivated. The deactivation of the second limiting module 29 is advantageous, for example, when the driving assistance system 15 is a driving assistance system according to an SAE level≥3.

The computing device 16 also comprises a second summation module 31. The second summation module 31 is configured so as to impinge the preliminary target wheel steering angle $preRLW_{Target}$ with the target additional angle $ZW_{Target}$. A target wheel steering angle $RLW_{Target}$ is specified or obtained as a result. If the target additional angle $ZW_{Target}$ is zero, then the preliminary target wheel steering angle $preRLW_{Target}$ corresponds to the target wheel steering angle $RLW_{Target}$. Thus, both the target variable Z and the actual actuating position $BS_{Actual}$ are considered as the input variable when specifying the target wheel steering angle $RLW_{Target}$, namely in a respective upstream step.

A second motor torque specification module 30 of the computing unit 16 is arranged downstream of the second summation module 31. The second motor torque specification module 30 is configured so as to specify a second target motor torque as a function of the target wheel steering angle $RLW_{Target}$ and to control the wheel actuator 10 as a function of the second target motor torque such that the target wheel steering angle is set as the target wheel steering angle $RLW_{Target}$.

The apparatus 13 also comprises an activation module 32. The activation module 32 is configured so as to provide an activation signal to the manual torque specification module 20, the additional torque module 21, and the additional angle specification module 28. For example, the activation module 32 is configured so as to provide the activation signal as a function of an activation of the driving assistance system 15.

If the driving assistance system 15 is active, the activation module 32 provides the activation signal. However, if the driving assistance system 15 is inactive, the activation signal is not provided.

According to the embodiment example shown in FIG. 2, the computing device 16 only comprises one computing unit 33, which is configured so as to specify both the target manual torque $HM_{Target}$ and the target wheel steering angle $RLW_{Target}$. According to a further embodiment example, these functions are divided into different computing units of the computing device 16. The different computing units are integrated into the same controller or into different controllers, respectively.

Figure 3:
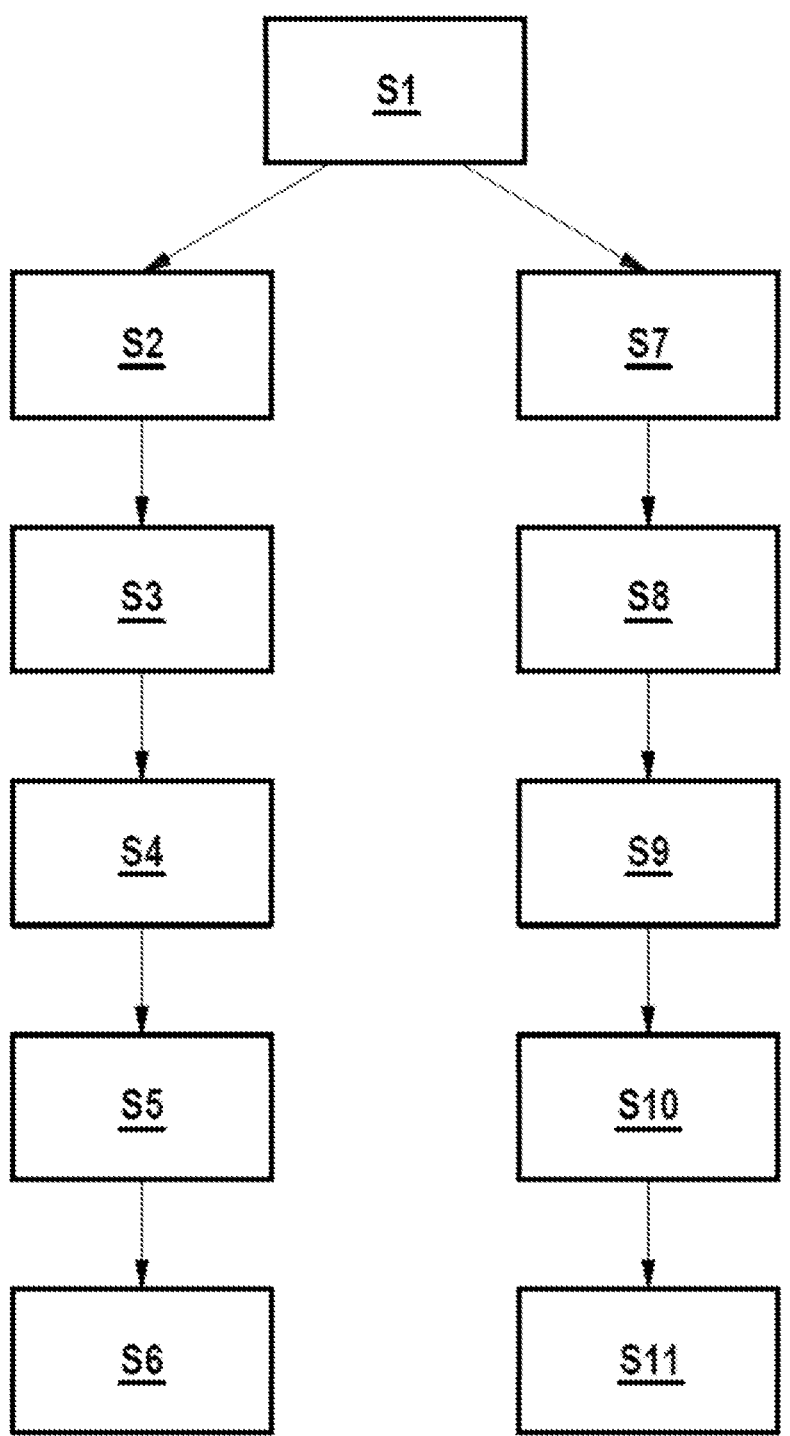
FIG. 3 a method of operating the motor vehicle.

Referring now to FIG. 3, an advantageous method of operating the steering system 8 will be explained in greater detail. FIG. 3 shows the method using a flow chart.

In a first step S1, it is checked whether the activation signal is present.

If the activation signal is not present, refer to a second step S2. In the second step S2, the second operating mode is then set. Also, the additional torque module 21 and the additional angle specification module 28 are inactivated or remain inactive.

In a third step S3, the target manual torque $HM_{Target}$ is specified. For this purpose, the manual torque specification module 20 first provides the preliminary target manual torque $preHM_{Target}$ as a function of the second force, as previously described. Because the additional torque module 21 is inactive, no target additional torque $ZM_{Target}$ is specified, so that the preliminary target manual torque $preHM_{Target}$ directly corresponds to the target manual torque $HM_{Target}$.

In a fourth step S4, the steering handle actuator 12 is then controlled as a function of the target manual torque $HM_{Target}$ specified in step S3.

In a fifth step S5, the target wheel steering angle $RLW_{Target}$ is determined. For this purpose, the steering ratio module 25 initially specifies the preliminary target wheel steering angle $preRLW_{Target}$. Because the additional angle specification module 28 is inactive, no target additional angle $ZW_{Target}$ is specified, so that the preliminary target wheel steering angle $preRLW_{Target}$ directly corresponds to the target wheel steering angle $RLW_{Target}$.

In a sixth step S6, the wheel actuator 10 is controlled as a function of the specified target wheel steering angle $RLW_{Target}$.

In summary, in the absence of the activation signal, the target manual torque $HM_{Target}$ is specified as a function of the second force. The second force, in turn, as mentioned above, is specified as a function of the rack force so that the target manual torque $HM_{Target}$ depends on the rack force. The aforementioned sub-modules of the manual torque specification module 20 use the actual actuating position $BS_{Actual}$ as the input variable. The target wheel steering angle $RLW_{Target}$ is specified as a function of the actual actuating position $BS_{Actual}$, so that the actual wheel steering angle $RLW_{Actual}$ ultimately follows the actual actuating position $BS_{Actual}$. The target value Z is not taken into account in the specification of the target manual torque $HM_{Target}$ as well as in the specification of the target wheel steering angle $RLW_{Target}$.

However, if it is determined in step S1 that the activation signal is present, then reference is made to a seventh step S7. In the seventh step S7, the first operating mode is then set. In addition, the additional torque module 21 and the additional angle specification module 28 are activated or remain active.

In an eighth step S8, the target manual torque $HM_{Target}$ is specified. For this purpose, the manual torque specification module 20 initially specifies the preliminary target manual torque $preHM_{Target}$ as a function of the first force, as previously described. The aforementioned sub-modules of the manual torque specification module 20 use the deviation $\Delta BS$ as the input variable. The preliminary target manual torque $preHM_{Target}$ is then specified as a function of the target variable Z. Because the additional torque module 21 is active, the additional torque module 21 specifies the target additional torque $ZM_{Target}$, wherein the target additional torque $ZM_{Target}$ can be positive, negative, or zero. Finally, the target manual torque $HM_{Target}$ is specified by impinging the preliminary target manual torque $preHM_{Target}$ with the target additional torque $ZM_{Target}$.

In a ninth step S9, the steering handle actuator 12 is then controlled as a function of the target manual torque $HM_{Target}$ specified in the eighth step S8.

In a tenth step S10, the target wheel steering angle $RLW_{Target}$ is determined. For this purpose, the steering ratio module 25 initially determines the preliminary target wheel steering angle $preRLW_{Target}$. Because the additional angle specification module 28 is active, the additional angle specification module 28 specifies a target additional angle $ZW_{Target}$, wherein the target additional angle $ZW_{Target}$ can be negative, positive, or zero. Finally, the target wheel steering angle $RLW_{Target}$ is obtained by impinging the preliminary target wheel steering angle $preRLW_{Target}$ with the target additional angle $ZW_{Target}$. The target wheel steering angle $RLW_{Target}$ is thus specified as a function of the actual actuating position $BS_{Actual}$ and the target variable Z.

In an eleventh step S11, the wheel actuator 10 is controlled as a function of the specified target wheel steering angle $RLW_{Target}$.

In summary, when the activation signal is present, the target manual torque $HM_{Target}$ is specified as a function of the target variable Z. It is hereby achieved that the actuating position of the steering handle 11 follows the specification of the driving assistance system 15. Both the specification of the manual torque specification module 20 and the specification of the additional torque module 21 are taken into account. The concrete design of the method with regard to the specification of the target wheel steering angle $RLW_{Target}$ is also related to the automation stage of the driving assistance system 15. If the driving assistance system 15 is a driving assistance system according to an SAE level<3, the target wheel steering angle $RLW_{Target}$ is determined as a function of the actual actuating position $BS_{Actual}$ of the steering handle 12 and the target variable Z in the presence of the activation signal. By considering the target variable Z, it is achieved that the specification of the driving assistance system 15 is actually implemented in a steering. By considering the actual actuating position $BS_{Actual}$ as well as by limiting the target additional angle $ZW_{Target}$, it is achieved that the user can easily control the steering. In particular, by manually adjusting a corresponding actual actuating position $BS_{Actual}$ of the steering handle 11, the user can override the specification of the driving assistance system 15. However, if the driving assistance system 15 is a driving assistance system according to an SAE level≥3, the second limiting module 29 is preferably deactivated or remains inactive in the presence of the activation signal. Target additional angles $ZW_{Target}$ of any size are then possible. As a result, it can be achieved that the user is overruled and to this extent no longer has access.

In the embodiment example explained with reference to the figures, the driving assistance system 15 only specifies a target variable Z, which is used as a basis for the specification of the target manual torque $HM_{Target}$ as well as the specification of the target wheel steering angle $RLW_{Target}$. According to a further embodiment example, the driving assistance system 15 specifies the target variable Z and a further target variable. The target manual torque $HM_{Target}$ is then specified as a function of the target variable Z and the target wheel steering angle $RLW_{Target}$ as a function of the further target variable. Such an embodiment of the driving assistance system 15 can dispense with transfer modules 18 and 26. In particular, the driving assistance system 15 then performs the transfer functions and directly specifies the target actuating position $BS_{Target}$ as the target variable Z directly specifies the angular value provided to the second differential module 27 as the further target variable.

What is claimed is:

1. An apparatus for a steering system of a motor vehicle, wherein the steering system comprises an actuatable steering handle and at least one steerable wheel, wherein the actuatable steering handle is mechanically decoupled from the at least one steerable wheel such that an actuation of the actuatable steering handle is independent from a steering of the at least one steerable wheel, wherein the actuatable steering handle is associated with a steering handle actuator that is controllable to generate a torque acting on the actuatable steering handle, and wherein the at least one steerable wheel is associated with a wheel actuator that is controllable to influence a wheel steering angle of the at least one steerable wheel, comprising:

a computing device configured to control the steering handle actuator and the wheel actuator, and configured to specify a target manual torque for the actuatable steering handle as a function of a target variable directly provided by a driving assistance system, and configured to control the steering handle actuator as a function of the target manual torque, wherein the target variable is at least one of (i) a target actuating position of the actuatable steering handle, or (ii) a target wheel steering angle of the at least one steerable wheel or a target rack position of a rack of the steering system, and wherein the computing device is further configured to specify the target manual torque as a function of (i) a deviation of an actual actuating position of the actuatable steering handle from the target actuating position, or (ii) a deviation of an actual wheel steering angle of the at least one steerable wheel from the target wheel steering angle, or a deviation of an actual rack position from the target rack position.

2. The apparatus according to claim 1, wherein the target variable is the target wheel steering angle of the at least one steerable wheel, and the computing device is further configured to:

control the wheel actuator so that the wheel steering angle of the at least one steerable wheel is the target wheel steering angle.

3. The apparatus according to claim 2, wherein the computing device is further configured to control the wheel steering angle of the at least one steerable wheel as a function of the actual actuating position of the actuatable steering handle.

4. The apparatus according to claim 2, wherein the computing device is further configured to modify the target variable using at least one transfer function.

5. The apparatus according to claim 1, wherein the apparatus comprises a steering feeling calculation function and is configured to specify the target manual torque in case of an inactive driving assistance system as well as an active driving assistance system according to the steering feeling calculation function.

6. The apparatus according to claim 1, wherein the computing device is further configured (i) to determine a first force as a function of the deviation of the actual actuating position of the actuatable steering handle from the target actuating position, and (ii) to specify the target manual torque as a function of the first force when the driving assistance system is active.

7. The apparatus according to claim 6, wherein the computing device is further configured to determine a second force as a function of an actual resetting force acting on the at least one steerable wheel and to specify the target manual torque as a function of the second force when the driving assistance system is inactive.

8. The apparatus according to claim 1, wherein the computing device further comprises a gradient limiting module configured to limit a rate of change of the target manual torque.

9. The apparatus according to claim 1, wherein the computing device further comprises an additional torque module which is configured to specify a target additional torque and to impinge the target manual torque with the target additional torque.

10. The apparatus according to claim 9, wherein the additional torque module is configured to provide the target additional torque as a function of the deviation of the actual actuating position of the actuatable steering handle from the target actuating position and/or as a function of a deviation of an actual trajectory of the motor vehicle from a specified target trajectory of the motor vehicle.

11. The apparatus according to claim 1, wherein:
the computing device further comprises a computing unit configured to specify the target wheel steering angle to the wheel actuator and the target manual torque to the steering handle actuator; or
the computing device comprises a first computing unit and a second computing unit, wherein the first computing unit is configured to specify the target manual torque to the steering handle actuator, and the second computing unit is configured to specify the target wheel steering angle to the wheel actuator.

12. The apparatus according to claim 2, wherein the computing device further comprises a communication device configured to receive the target variable directly from the driving assistance system.

13. A motor vehicle having a steering system comprising:
an actuatable steering handle;
at least one steerable wheel, wherein
the actuatable steering handle is mechanically decoupled from the at least one steerable wheel such that an actuation of the actuatable steering handle is independent from a steering of the at least one steerable wheel,
the actuatable steering handle is associated with a steering handle actuator that is controllable to generate a torque acting on the actuatable steering handle,
the at least one steerable wheel is associated with a wheel actuator that is controllable to influence a wheel steering angle of the at least one steerable wheel; and
an apparatus including a computing device configured to control the steering handle actuator and the wheel actuator, and configured to specify a target manual torque for the actuatable steering handle as a function of a target variable directly provided by a driving assistance system, and configured to control the steering handle actuator as a function of the target manual torque,
wherein the target variable is at least one of (i) a target actuating position of the actuatable steering handle, or (ii) a target wheel steering angle of the at least one steerable wheel or a target rack position of a rack of the steering system, and
wherein the computing device is further configured to specify the target manual torque as a function of (i) a deviation of an actual actuating position of the actuatable steering handle from the target actuating position, or (ii) a deviation of an actual wheel steering angle of the at least one steerable wheel from the target wheel steering angle, or a deviation of an actual rack position from the target rack position.

14. A method for operating a steering system of a motor vehicle, wherein the steering system comprises an actuatable steering handle and at least one steerable wheel, wherein the actuatable steering handle is mechanically decoupled from the at least one steerable wheel such that an actuation of the actuatable steering handle is independent from a steering of the at least one steerable wheel, wherein the actuatable steering handle is associated with a steering handle actuator that is controllable by a computing device to generate a torque acting on the actuatable steering handle, and wherein the at least one steerable wheel is associated with a wheel actuator that is controllable by the computing device to influence a wheel steering angle of the at least one steerable wheel, the method comprising:
directly providing a target variable as an output of a driving assistance system to the computing device, the target variable is at least one of (i) a target actuating position of the actuatable steering handle, or (ii) a target wheel steering angle of the at least one steerable wheel or a target rack position of a rack of the steering system;
specifying, using the computing device, a target manual torque for the actuatable steering handle as a function of (i) a deviation of an actual actuating position of the actuatable steering handle from the target actuating position, or (ii) a deviation of an actual wheel steering angle of the at least one steerable wheel from the target wheel steering angle, or a deviation of an actual rack position from the target rack position; and
controlling the steering handle actuator as a function of the target manual torque using the computing device.

15. The apparatus according to claim 1, wherein:
the computing device is configured to increase the target manual torque in response to an increase of the deviation of the actual actuating position of the actuatable steering handle from the target actuating position, and
the computing device is configured to decrease the target manual torque in response to a decrease of the deviation of the actual actuating position of the actuatable steering handle from the target actuating position.

16. The apparatus according to claim 1, wherein the target variable includes both (i) the target actuating position of the actuatable steering handle, and (ii) the target wheel steering angle of the at least one steerable wheel or the target rack position of the rack of the steering system.

* * * * *